United States Patent
Morris et al.

(10) Patent No.: US 12,379,845 B2
(45) Date of Patent: Aug. 5, 2025

(54) CONNECTION MODIFICATION BASED ON TRAFFIC PATTERN

(71) Applicant: Advanced Micro Devices, Inc., Santa Clara, CA (US)

(72) Inventors: Nathaniel Morris, Austin, TX (US); Kevin Yu-Cheng Cheng, Bothell, WA (US); Atul Kumar Sujayendra Sandur, Santa Clara, CA (US); Sergey Blagodurov, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 279 days.

(21) Appl. No.: 17/957,732

(22) Filed: Sep. 30, 2022

(65) Prior Publication Data

US 2024/0111421 A1    Apr. 4, 2024

(51) Int. Cl.
G06F 3/06    (2006.01)
(52) U.S. Cl.
CPC .......... G06F 3/0611 (2013.01); G06F 3/0653 (2013.01); G06F 3/0673 (2013.01)
(58) Field of Classification Search
CPC ..... G06F 3/0611; G06F 3/0653; G06F 3/0673
See application file for complete search history.

(56) References Cited

U.S. PATENT DOCUMENTS

| | | | |
|---|---|---|---|
| 11,467,999 B2* | 10/2022 | Das Sharma | G06F 13/4068 |
| 2011/0173352 A1* | 7/2011 | Sela | G06F 1/3253 |
| | | | 710/16 |
| 2012/0324146 A1* | 12/2012 | Marks | G06F 3/0613 |
| | | | 711/E12.001 |
| 2013/0086309 A1 | 4/2013 | Lee et al. | |
| 2019/0116108 A1 | 4/2019 | Gibson et al. | |
| 2019/0303281 A1 | 10/2019 | Firoozshahian et al. | |
| 2021/0041929 A1* | 2/2021 | Connor | H04L 12/10 |
| 2022/0129179 A1* | 4/2022 | Choi | G06F 3/0635 |
| 2022/0197506 A1 | 6/2022 | Blagodurov et al. | |
| 2022/0342572 A1* | 10/2022 | Gyllenskog | G06F 3/0683 |
| 2023/0076468 A1* | 3/2023 | Schluessler | G06F 1/3253 |

FOREIGN PATENT DOCUMENTS

WO    2024072935 A1    4/2024

OTHER PUBLICATIONS

PCT/US2023/033940, "International Seach Report and Written Opinion", PCT Application No. PCT/US2023/033940, Jan. 19, 2024, 7 pages.

Milic, Ugljesa, et al., "Beyond the socket: NUMA-aware GPUs", Proceedings of the 50th Annual IEEE/ACM International Symposium on Microarchitecture [retrieved Aug. 23, 2022]. Retrieved from the internet <http://eimanebrahimi.com/pub/milic_micro17.pdf>., Oct. 14, 2017, 13 Pages.

* cited by examiner

*Primary Examiner* — Henry Tsai
*Assistant Examiner* — Harry Z Wang
(74) *Attorney, Agent, or Firm* — FIG. 1 Patents

(57) ABSTRACT

Connection modification based on traffic pattern is described. In accordance with the described techniques, a traffic pattern of memory operations across a set of connections between at least one device and at least one memory is monitored. The traffic pattern is then compared to a threshold traffic pattern condition, such as an amount of data traffic in different directions across the connections. A traffic direction of at least one connection of the set of connections is modified based on the traffic pattern corresponding to the threshold traffic pattern condition.

20 Claims, 5 Drawing Sheets

400

402
Calculate, over a time period, a first traffic size for memory operations in a first direction over the set of connections between the at least one device and the at least one memory

404
Calculate a second traffic size over the time period for memory operations in a second direction over the set of connections between the at least one device and the at least one memory

406
Calculate, based on the first traffic size, a first traffic usage for the set of connections utilized in the first direction over the time period

408
Calculate, based on the second traffic size, a second traffic usage for the set of connections utilized in the second direction over the time period

410
Compare the first traffic usage and the second traffic usage to a threshold traffic pattern condition

412
Determine whether to modify a direction of at least one connection based on the comparison of the first traffic usage and the second traffic usage to the threshold traffic pattern condition

FIG. 4

CONNECTION MODIFICATION BASED ON TRAFFIC PATTERN

BACKGROUND

Composable systems enable different computing system resources to be configured for access in different ways, such as for access to memory resources, processing resources, network resources, and so forth. For instance, in a composable system, hardware resources are reconfigurable to meet different computing workload parameters.

BRIEF DESCRIPTION OF THE DRAWINGS

The detailed description is described with reference to the accompanying figures.

FIG. 4 illustrates a flow diagram depicting a procedure in an example implementation of connection modification based on traffic pattern in accordance with one or more implementations.

DETAILED DESCRIPTION

Overview

Figure 1:
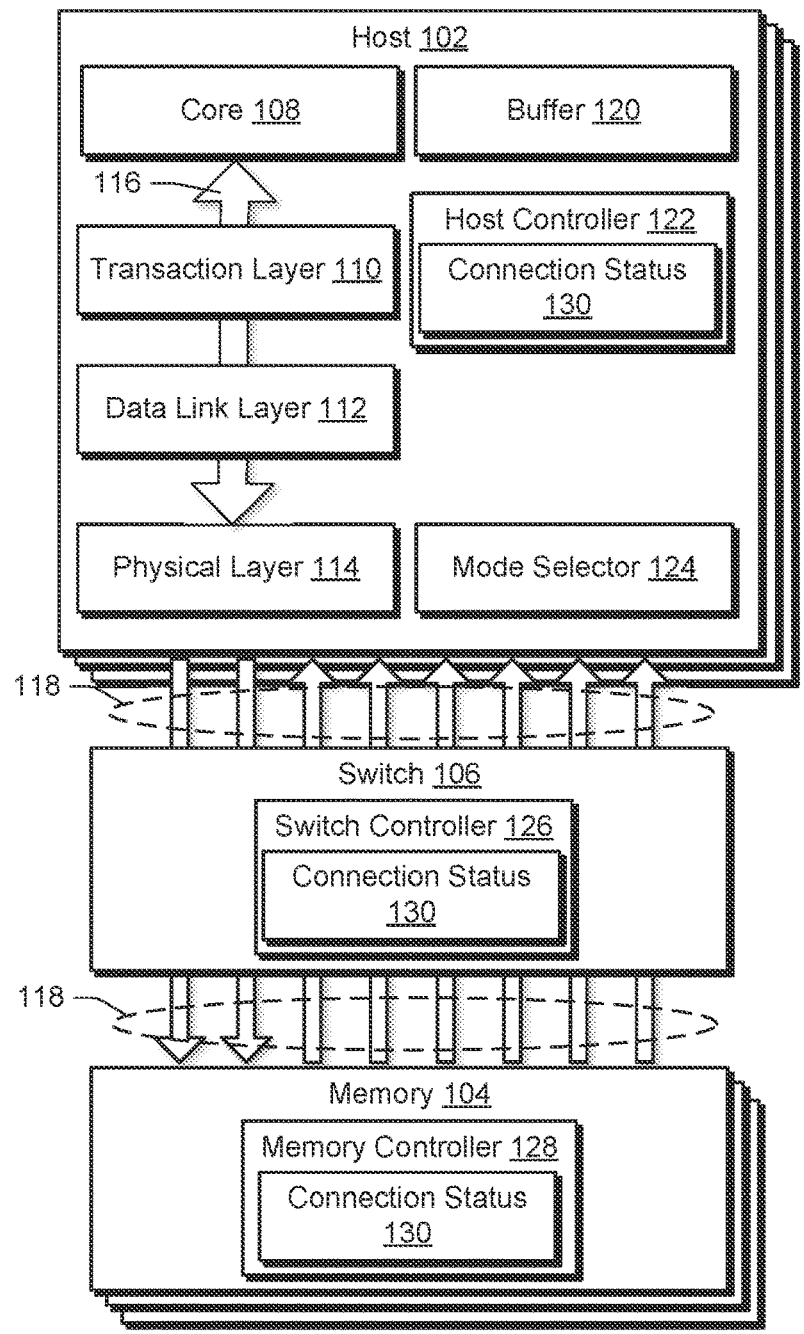
FIG. 1 is a block diagram of a non-limiting example system for connection modification based on traffic pattern in accordance with one or more implementations.

Some conventional implementations for composable systems provide reconfigurable hardware access for generating different combinations of hardware resources to meet different computing task parameters. However, in conventional implementations for composable systems, a number of data connections and the direction that data flows on those connections are typically static during runtime, which can result in both excessive burden on some connections and underutilization of other connections.

For instance, in the context of compute node access to memory resources, memory intensive workloads are known to saturate read/write bandwidth across an interconnect. In addition, execution phases of a workload are likely to generate asymmetric Input/Output traffic that is either read or write dominant. Accordingly, in some conventional composable system implementations, high access latencies are experienced due to the static nature of the interconnect, the distributed nature of memory resources, as well as queueing delays that increase latency for memory and coherency requests.

To solve these problems, connection modification based on traffic pattern is described. The described techniques, for example, enable dynamic direction adjustment of connections between a host (e.g., a compute node and/or a CPU host) and a memory based on traffic patterns observed across the connections. The traffic patterns, for example, are based on memory operations that occur between the host and the memory, such as read and write operations. In at least one implementation the memory is implemented as a Fabric-Attached Memory (FAM) and connections between the host and the memory represent Compute Express Link (CXL) lanes that interconnect the host and the FAM. This is not to be construed as limiting, however, and implementations described herein are applicable to a wide variety of architectures and communication protocols.

According to implementations, the set of connections between the host and the memory includes a first subset of connections that are configured for downstream traffic between the host and the memory a second subset of connections that are configured for upstream traffic from the memory to the host. Further, the first subset of connections and the second subset of connections are each configured with a default number of connections that is reconfigurable to accommodate different data traffic conditions.

Further to implementations, a controller observes traffic across the set of connections including downstream traffic load on the first set of connections and upstream traffic load on the second set of connections. The controller is implementable in various ways, such as at the host, at a switch that interconnects the host with the memory, and/or at the memory. Accordingly, based on the observed traffic across the connections, the controller is operable to determine if a connection modification is to be performed to modify a directionality of one or more connections to provide an additional connectivity resource. For instance, if a downstream traffic load on the first set of connections exceeds a usage threshold, a connection from the second set of connections is modified from an upstream direction to a downstream direction to provide an additional connectivity resource for downstream traffic from the host to the memory. Further, if an upstream traffic load on the second set of connections exceeds a usage threshold, a connection from the first set of connections is modified from a downstream direction to an upstream direction to provide an additional connectivity resource for upstream traffic from the memory to the host.

Accordingly, unlike conventional systems, implementations described herein enable connections between a host and memory to be dynamically configured and reconfigured to adapt to different data traffic patterns, such as real time fluctuations between downstream and upstream traffic loads. For instance, when traffic load in one direction experiences increased utilization, additional connection resources are reallocated to accommodate the increased traffic load.

Thus, as compared to conventional systems, the techniques described herein reduce memory operation latency between a device and a memory and provide more efficient utilization of connectivity resources between the device and the memory.

In some aspects, the techniques described herein relate to a system including: at least one processor; and computer-executable instructions that are executable by the at least one processor to: monitor a traffic pattern for memory operations across a set of connections between at least one device and at least one memory; compare the traffic pattern to a threshold traffic pattern condition; and modify a direction of at least one connection of the set of connections based on the traffic pattern corresponding to the threshold traffic pattern condition.

In some aspects, the techniques described herein relate to a system, wherein the threshold traffic pattern condition includes a threshold amount of traffic in a first direction across the set of connections, and wherein to modify the traffic direction of the at least one connection, the computer-executable instructions are executable by the at least one processor to modify the at least one connection from a second traffic direction to the first traffic direction.

In some aspects, the techniques described herein relate to a system, wherein: the set of connections include a first subset of connections configured for a first traffic direction between the at least one device and the at least one memory, and a second subset of connections configured for a second traffic direction between the at least one memory and the at least one device, wherein the second subset of connections includes the at least one connection configured for the second traffic direction; to monitor the traffic pattern of memory operations includes to monitor memory operations in the first direction across the first subset of connections; to compare the traffic pattern to the threshold traffic pattern condition includes to compare the memory operations in the first direction to a usage threshold; and to modify the traffic direction of the at least one connection includes to change the at least one connection to the first traffic direction based on the memory operations in the first direction corresponding to the usage threshold.

In some aspects, the techniques described herein relate to a system, wherein to monitor the traffic pattern for memory operations includes to: calculate, over a time period, a first traffic size for memory operations in a first direction over the set of connections between the at least one device and the at least one memory; calculate, over the time period, a second traffic size for memory operations in a second direction over the set of connections between the at least one memory and the at least one device; calculate, based on the first traffic size, a first traffic usage for the set of connections utilized in the first direction over the time period; and calculate, based on the second traffic size, a second traffic usage for the set of connections utilized in the second direction over the time period, wherein the threshold traffic pattern condition is based on one or more of the first traffic usage or the second traffic usage.

In some aspects, the techniques described herein relate to a system, wherein the first traffic usage includes a percentage of the set of connections utilized for traffic over the set of connections in the first direction over the time period, and the second traffic usage includes a percentage of the set of connections utilized for traffic over the set of connections in the second direction over the time period.

In some aspects, the techniques described herein relate to a system, wherein to modify the traffic direction of the at least one connection includes to change the at least one connection from a first traffic direction across the set of connections to a second traffic direction across the set of connections, and wherein the computer-executable instructions are executable by the at least one processor to: pause direction change availability of the at least one connection based on the change of the at least one connection from the first traffic direction to the second traffic direction corresponding to a threshold change condition.

In some aspects, the techniques described herein relate to a system, wherein the computer-executable instructions are executable by the at least one processor to configure default traffic directions of a first subset of connections and a second subset of connections of the set of connections, wherein: the first subset of connections is configured for a first traffic direction between the at least one device and the at least one memory; and the second subset of connections is configured for a second traffic direction between the at least one device and the at least one memory, wherein to configure the default traffic directions includes to configure the first subset of connections with more connections of the set of connections than the second subset of connections.

In some aspects, the techniques described herein relate to a system including: at least one processor; and computer-executable instructions that are executable by the at least one processor to: compare changes in direction of a set of connections between at least one device and at least one memory to a threshold change condition; pause direction change availability of at least one connection of the set of connections based on changes in direction of the at least one connection corresponding to the threshold change condition; and resume direction change availability of the at least one connection based on occurrence of a resume condition.

In some aspects, the techniques described herein relate to a system, wherein the computer-executable instructions are further executable by the at least one processor to increment a counter of the at least one connection in response to changes in direction of the at least one connection, and wherein the threshold change condition includes an indication that the counter reaches a counter threshold.

In some aspects, the techniques described herein relate to a method including: monitoring a traffic pattern of memory operations across a set of connections between at least one device and at least one memory; comparing the traffic pattern to a threshold traffic pattern condition; and modifying a traffic direction of at least one connection of the set of connections based on the traffic pattern corresponding to the threshold traffic pattern condition.

In some aspects, the techniques described herein relate to a method, wherein the threshold traffic pattern condition includes a threshold amount of traffic in a first direction across the set of connections, and wherein modifying the traffic direction of the at least one connection includes modifying the at least one connection from a second traffic direction to the first traffic direction.

In some aspects, the techniques described herein relate to a method, wherein: the set of connections include a first subset of connections configured for a first traffic direction between the at least one device and the at least one memory, and a second subset of connections configured for a second traffic direction between the at least one memory and the at least one device, wherein the second subset of connections includes the at least one connection configured for the second traffic direction; monitoring the traffic pattern of memory operations includes monitoring memory operations in the first direction across the first subset of connections; comparing the traffic pattern to the threshold traffic pattern condition includes comparing the memory operations in the first direction to a usage threshold; and modifying the traffic direction of the at least one connection includes changing the at least one connection to the first traffic direction based on the memory operations in the first direction corresponding to the usage threshold.

In some aspects, the techniques described herein relate to a method, wherein comparing the memory operations in the first direction to the usage threshold includes: calculating a traffic usage in the first direction based on an amount of traffic in the first direction and a number of connections in the first subset of connections; and comparing the traffic usage in the first direction to the usage threshold.

In some aspects, the techniques described herein relate to a method, wherein monitoring the traffic pattern for memory operations includes: calculating, over a time period, a first traffic size for memory operations in a first direction over the set of connections between the at least one device and the at least one memory; calculating, over the time period, a second traffic size for memory operations in a second direction over the set of connections between the at least one memory and the at least one device; calculating, based on the first traffic size, a first traffic usage for the set of connections utilized in the first direction over the time period; and calculating, based on the second traffic size, a second traffic usage for the set of connections utilized in the second direction over the time period, wherein the threshold traffic pattern condition is based on one or more of the first traffic usage or the second traffic usage.

In some aspects, the techniques described herein relate to a method, wherein the first traffic usage includes a percentage of the set of connections utilized for traffic over the set of connections in the first direction over the time period, and the second traffic usage includes a percentage of the set of connections utilized for traffic over the set of connections in the second direction over the time period.

In some aspects, the techniques described herein relate to a method, wherein modifying the traffic direction of the at least one connection includes changing the at least one connection from a first traffic direction across the set of connections to a second traffic direction across the set of connections, and wherein the method further includes: pausing direction change availability of the at least one connection based on the change of the at least one connection from the first traffic direction to the second traffic direction corresponding to a threshold change condition.

In some aspects, the techniques described herein relate to a method, wherein modifying the traffic direction of the at least one connection includes changing the at least one connection from a first traffic direction across the set of connections to a second traffic direction across the set of connections, and wherein the method further includes: selecting the at least one connection for a direction change based on the at least one connection having a smallest pending queue of a subset of connections configured for the first traffic direction across the set of connections.

In some aspects, the techniques described herein relate to a method, further including emptying the pending queue of the at least one connection before changing the at least one connection from the first traffic direction to the second traffic direction.

In some aspects, the techniques described herein relate to a method, further including configuring default traffic directions of a first subset of connections and a second subset of connections of the set of connections, wherein: the first subset of connections is configured for a first traffic direction between the at least one device and the at least one memory; and the second subset of connections is configured for a second traffic direction between the at least one device and the at least one memory, wherein configuring the default traffic directions includes configuring the first subset of connections with more connections of the set of connections than the second subset of connections.

In some aspects, the techniques described herein relate to a method, wherein the first traffic direction includes upstream memory operations from the at least one memory to the at least one device, and the second traffic direction includes downstream memory operations from the at least one device to the at least one memory.

FIG. 1 is a block diagram of a non-limiting example system 100 for connection modification based on traffic pattern in accordance with one or more implementations. The system 100 includes a host 102 and a memory 104 which are interconnected by a switch 106 to enable the host 102 to utilize the memory 104 for different memory operations. The host 102 is configured to provide processing capability for an associated device such as a server, a desktop computing device, a portable computing device (e.g., a laptop, a smartphone, a tablet, etc.), and so forth. The host 102 includes a core 108, a transaction layer 110, a data link layer 112, and a physical layer 114 across which data 116 flows to and from the core 108.

The host 102 is an electronic circuit that performs various operations on and/or using data in the memory 104. Examples of the host 102 include, but are not limited to, a central processing unit (CPU), a graphics processing unit (GPU), a field programmable gate array (FPGA), an accelerated processing unit (APU), a digital signal processor (DSP), etc. The core 108 is a processing unit that reads and executes instructions (e.g., of a program), examples of which include writing data to and reading data from the memory 104. Although one core 108 is depicted in the illustrated example, in at least some implementations the host 102 includes more than one core 108, e.g., the host 102 is a multi-core processor.

The memory 104 is a device and/or system that is configured to store information, such as for use in a device, e.g., by the core 108 of the host 102 and/or by another device attached to the switch 106. In one or more implementations, the memory 104 corresponds to semiconductor memory where data is stored within memory cells on one or more integrated circuits. In at least one example, the memory 104 corresponds to and/or includes volatile memory, examples of which include random-access memory (RAM), dynamic random-access memory (DRAM), synchronous dynamic random-access memory (SDRAM), and static random-access memory (SRAM). Alternatively or in addition, the memory 104 corresponds to and/or includes non-volatile memory, examples of which include flash memory, read-only memory (ROM), programmable read-only memory (PROM), erasable programmable read-only memory (EPROM), and electronically erasable programmable read-only memory (EEPROM).

The switch 106 is a device and/or system that is configured to manage intercommunication of data between the host 102 and the memory 104. The system 100, for instance, includes a set of connections 118 between the host 102 and the memory 104 that are managed by the switch 106. According to one or more implementations, the connections 118 represent directional data connections between the host 102 and the memory 104 with configurable directionality. For instance, an individual connection 118 is dynamically configurable to provide either "downstream" data directionality for data from the host 102 to the memory 104, or "upstream" data directionality from the memory 104 to the host 102. In at least one implementation the connections 118 represent data transmission lanes between the host 102 and the memory 104, such as implemented according to the PCIe standard.

In at least some implementations, the connections 118 are utilized to implement PCIe-based data communication between the host 102, the switch 106, and the memory 104. Alternative or additional examples of interfaces used to connect the host 102 and the memory 104 for communication over the connections 118 include, by way of example and not limitation, CXL, inter-chip Global Memory Interconnect (xGMI), NVLink, etc. It is to be appreciated that in one or more implementations the host 102 and the memory 104 communicate using a different interface from those mentioned just above without departing from the spirit or scope of the described techniques.

Further to non-limiting example implementations for connection modification based on traffic pattern, the host 102 includes a buffer 120, a host controller 122, and a mode selector 124. The buffer 120 represents a data storage that the host 102 utilizes for temporary storage of data being utilized for various processing tasks. The host 102, for instance, utilizes the buffer 120 to generate data queues for different memory operations. The host controller 122 represents functionality for performing different aspects of connection modification based on traffic pattern, such as for switching directionality of the connections 118 for memory operations between the host 102 and the memory 104. As further detailed below, for example, the host controller 122 tracks traffic patterns for memory operations between the host 102 and the memory 104. Based on the observed traffic patterns, the host controller 122 interfaces with the mode selector 124 to cause dynamic reconfiguration of directionality of the connections 118 to adapt to observed traffic patterns and enable efficient utilization of the connections 118. In at least one implementation, the mode selector 124 operates at the physical layer 114 and enables changes in data directionality of the connections 118, such as based on instructions from the host controller 122.

Further to the system 100, the switch 106 includes a switch controller 126 and the memory 104 includes a memory controller 128. For instance, while various implementations are discussed herein with reference to operation of the host controller 122, it is to be appreciated that aspects of connection modification based on traffic pattern are additionally or alternatively performed by the switch controller 126 and/or the memory controller 128. The switch controller 126 and/or the memory controller 128, for example, are operable to observe traffic patterns across the connections 118 and/or to perform directionality switching of the connections 118 based on observed traffic patterns. In at least one implementation the host controller 122 performs cooperative intercommunication with the switch controller 126 and/or the memory controller 128 to implement aspects of connection modification based on traffic pattern.

The system 100 further includes connection status 130 which is maintained by the host controller 122, the switch controller 126, and/or the memory controller 128. The connection status 130 includes data that indicates a status of the connections 118, including a traffic status (e.g., traffic load over time periods) and a directionality status of each connection 118.

Figure 2:
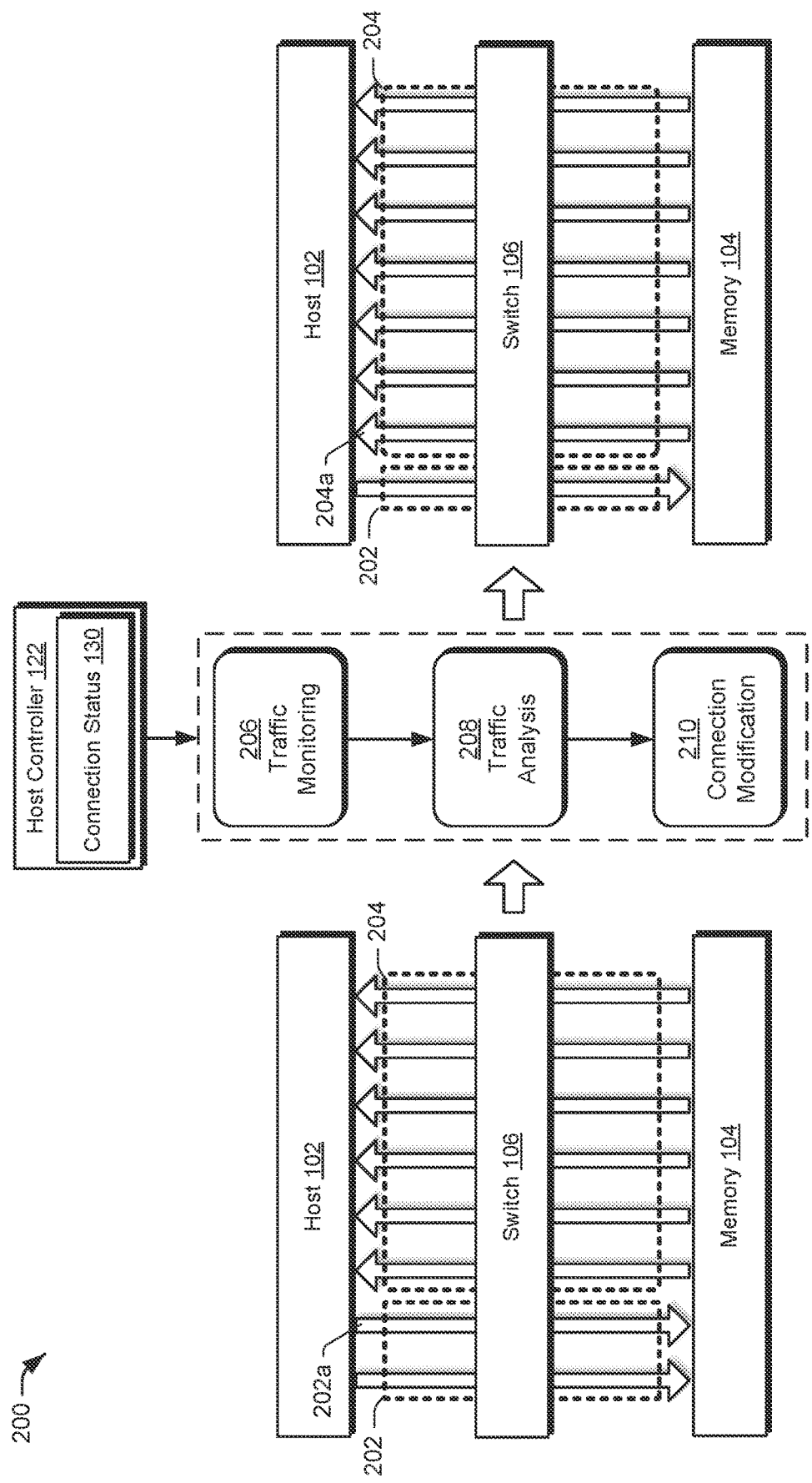
FIG. 2 depicts a non-limiting example operation scenario for connection modification based on traffic pattern in accordance with one or more implementations.

FIG. 2 depicts a non-limiting example operation scenario 200 for connection modification based on traffic pattern in accordance with one or more implementations. The scenario 200 includes the host 102 interconnected via the connections 118 to the switch 106 and the memory 104. Further, the connections 118 include a first connection set 202 and a second connection set 204. The connection sets 202, 204 are configured with differing data directionality between the host 102 and the memory 104. For instance, the connection set 202 is configured for downstream data operations between the host 102 and the memory 104, e.g., for data operations where data flows from the host 102 to the memory 104. Examples of downstream data operations include data generated by the host 102 and transmitted by the host 102 for storage on the memory 104, load requests from the host 102 requesting that the memory 104 return data to the host 102, etc.

Further, the connection set 204 is configured for upstream data operations from the memory 104 to the host 102, e.g., data operations where data flows from the memory 104 to the host 102. Examples of upstream data operations include load responses that include data requested by the host 102, data store acknowledgements in response to data storage operations requested by the host 102 and performed by the memory 104, etc.

In this particular example the connection set 204 includes more connections (e.g., lanes) than the connection set 202. For instance, a default configuration of the connections 118 allocates more data connections for upstream operations between the memory 104 and the host 102 than for downstream operations from the host 102 to the memory 104. For instance, n % of the connections 118 are allocated to the connection set 204, where n=75 and/or other suitable integer value. In at least some implementations n is a configurable value, such as by a user.

Further to the scenario 200, the host controller 122 maintains the connection status 130 for the connection sets 202, 204, e.g., amounts of traffic across the connection sets and directionality of the connection sets. The host controller 122, for instance, performs traffic monitoring 206 to monitor data transmitted across the connection sets 202, 204. In at least one implementation the traffic monitoring 206 includes tracking, over a phase interval period of time T, counts of downstream operations across the connection set 202 and counts of upstream operations across the connection set 204. The interval T is definable using any suitable unit such as milliseconds (ms), seconds, minutes, etc.

Based on the traffic monitoring 206 the host controller 122 performs traffic analysis 208. The traffic analysis 208, for example, includes calculating amounts of downstream traffic across the connection set 202 and amounts of upstream traffic across the connection set 204. In at least one implementation the traffic analysis 208 includes calculating a downstream bandwidth and an upstream bandwidth. The downstream bandwidth, for instance, is calculated as a function of downstream traffic size over the time interval T, and the upstream bandwidth is calculated as a function of upstream traffic size of the time interval T. Further, the downstream bandwidth and the upstream bandwidth are specified in a suitable unit, such as megabytes (MB)/T, gigabytes (GB)/T, terabytes (TB)/T, etc.

The traffic analysis 208 also includes determining a relative amount (e.g., percentage) of the connections utilized in each of the connection sets 202, 204. For instance, the utilization of the connection set 202 (e.g., downstream utilization) over T is calculated as a function of the downstream bandwidth over a combination of a maximum bandwidth across each connection of the connection set 202 and a number of connections in the connection set 202.

Further, the traffic analysis 208 includes calculating the utilization of the connection set 204 (e.g., upstream utilization) over T is as a function of the upstream bandwidth over a combination of a maximum bandwidth across each connection of the connection set 204 and a number of connections in the connection set 204. In at least one implementation the maximum bandwidth values for the connection sets 202, 204 are based on a type of interface utilized for the connection sets 202, 204.

The traffic analysis 208 also includes comparing the upstream utilization and the downstream utilization to a utilization threshold value. In at least in implementation the utilization threshold value=75%. For instance, if the upstream utilization is greater than the utilization threshold value, the traffic analysis 208 indicates to perform a connection modification 210 to allocate more connections to the connection set 204. Further, if the downstream utilization is greater than the utilization threshold value, the traffic analysis 208 indicates to perform the connection modification 210 to allocate more connections to the connection set 202.

Consider that in the example scenario 200, utilization of the connection set 204 exceeds a threshold utilization (e.g., upstream utilization is greater than the utilization threshold)

such that the connection modification 210 includes modifying a direction of a connection from the connection set 202. For instance, a connection 202a of the connection set 202 is reconfigured as a connection 204a of the connection set 204, e.g., from a downstream direction to an upstream direction. The connection 202a, for example, is reallocated from the connection set 202 to the connection set 204 as the connection 204a.

According to implementations, the different operations of the scenario 200 (e.g., the traffic monitoring 206, the traffic analysis 208, and the connection modification 210) are performed periodically and/or occasionally, such as every time period T and/or after every x memory operations across the connections 118. For instance, traffic statistics gathered by the traffic monitoring 206 and analyzed by the traffic analysis 208 are reset after every T.

Further, in one or more implementations the operations include sampling of memory operations. For instance, the traffic monitoring 206 and/or the traffic analysis 208 are performed on every y memory operations across the connections 118, where y=an integer such as 10, 20, etc.

In at least one implementation the host controller 122 implements an N-bit saturating counter for each connection 118 to prevent excessive direction swapping. Excessive direction swapping of a connection 118, for instance, degrades system performance. For example, N is a configurable parameter of the host controller 122, where in an example N=1 kilobyte (kB) or other suitable size value by default. In at least one implementation the host controller 122 increments the saturation counter by a bit value for a connection 118 when a direction of the connection 118 is reconfigured. If the saturation counter for a particular connection 118 saturates (e.g., the counter=N), the host controller 122 temporarily stops switching a direction of the particular connection 118 such as for a time period. The host controller 122, for instance, pauses the availability of the particular connection 118 for a direction change for a time period.

According to one or more implementations a connection 118 which is designated for a direction change has a memory operation queued in the buffer 120. The connection 202a, for instance, is awaiting a connection credit in the connections 118 to perform a particular downstream memory operation. In implementations, the host controller 122 selects the connection 202a for a direction change based on the connection 202a being a connection of the connection set 202 with a smallest pending queue. Further, before the direction of the connection 202a is reconfigured to the connection 204a, the queue for the connection 202a in the buffer 120 is emptied. A pending memory operation for the connection 202a, for example, is executed before a direction of the connection 202a is switched.

Figure 3:
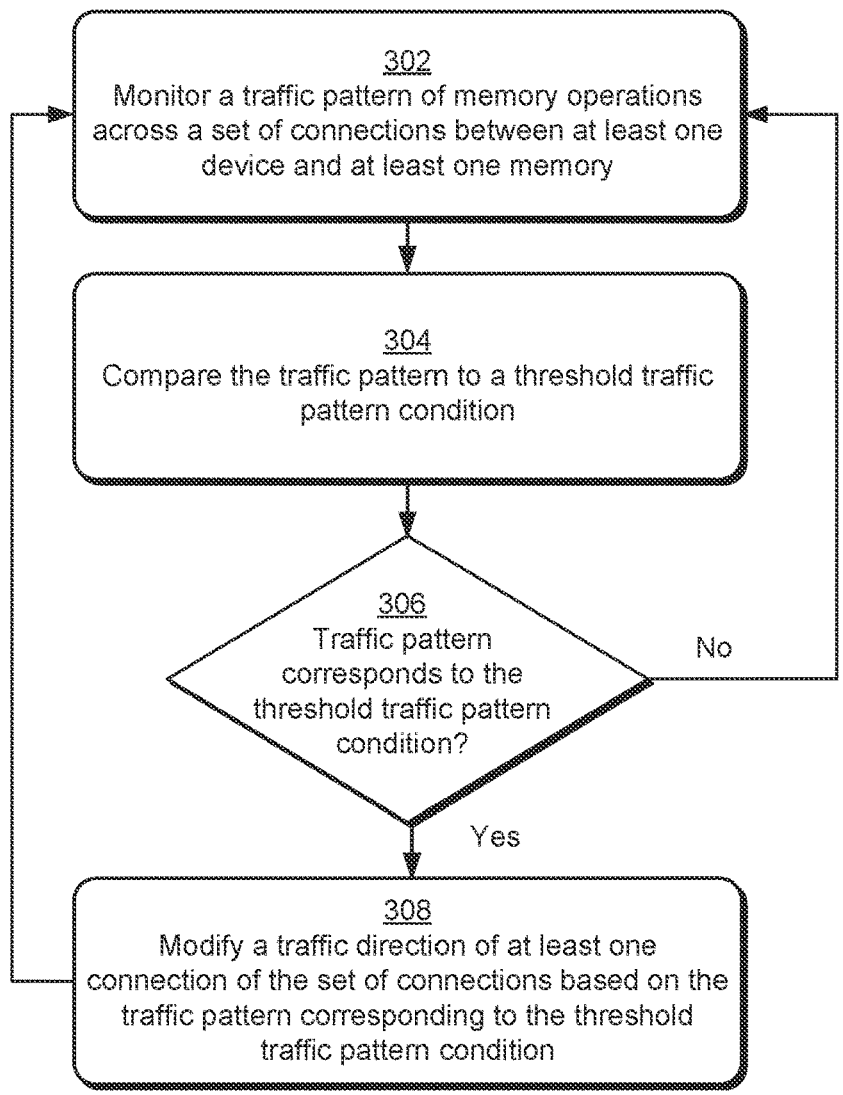
FIG. 3 illustrates a flow diagram depicting a procedure in an example implementation of connection modification based on traffic pattern in accordance with one or more implementations.

FIG. 3 illustrates a flow diagram depicting a procedure 300 in an example implementation of connection modification based on traffic pattern in accordance with one or more implementations. Aspects of the procedure 300, for example, are implemented in the context of the system 100.

A traffic pattern of memory operations across a set of connections between at least one device and at least one memory is monitored (block 302). By way of example, the host controller 122 monitors traffic patterns for memory operations across the connections 118 between the host 102 and the memory 104. The traffic pattern is compared to a threshold traffic pattern condition (block 304). The host controller 122, for example, compares attributes of memory operations across the connections 118 to a threshold traffic pattern condition. For instance, the threshold traffic pattern condition represents a threshold amount of data traffic across the connections 118 in an upstream direction and/or a downstream direction and over a period T.

A determination is made whether the traffic pattern corresponds to the threshold traffic pattern condition (block 306). For example, the host controller 122 determines whether the observed traffic pattern(s) across the connections 118 correspond to the threshold traffic pattern condition. If observed the traffic pattern does not correspond to the threshold traffic pattern condition ("No"), the procedure returns to block 302. The host controller 122, for example, monitors traffic patterns over a time period T and compares the traffic patterns to the threshold traffic pattern condition. If the observed traffic patterns over T do not correspond to the threshold traffic pattern condition, the host controller 122 resets monitored traffic pattern attributes and resumes monitoring of traffic patterns of memory operations across the connections 118, e.g., at block 302.

If observed the traffic pattern corresponds to the threshold traffic pattern condition ("Yes"), traffic direction of at least one connection of the set of connections is modified based on the traffic pattern corresponding to the threshold traffic pattern condition (block 308). The host controller 122, for example, changes a direction of a connection 118 to provide an additional connectivity resource for a direction of memory operations across the connections 118 between the host 102 and the memory 104.

According to one or more implementations, after modifying a traffic direction of the at least one connection at block 308, the procedure returns to block 302.

FIG. 4 illustrates a flow diagram depicting a procedure 300 in an example implementation of connection modification based on traffic pattern in accordance with one or more implementations. Aspects of the procedure 400, for example, are implemented in the context of the system 100. In at least one implementation the procedure 400 describes an example way for performing aspects of the procedure 300.

A first traffic size is calculated over a time period for memory operations in a first direction over a set of connections between at least one device and at least one memory (block 402). A second traffic size is calculated over the time period for memory operations in a second direction over the set of connections between the at least one device and the at least one memory (block 404). For instance, the host controller 122 monitors memory operations in upstream and downstream directions across the connections 118 and calculates an amount of traffic in each direction. In at least one implementation the amount of traffic is calculated in units of such as MB, GB, TB, etc., across the connections 118 in upstream and downstream directions over time period T.

A first traffic usage for the set of connections utilized in the first direction over the time period is calculated based on the first traffic size (block 406). A second traffic usage for the set of connections utilized in the second direction over the time period is calculated based on the second traffic size (block 408). The host controller 122, for example, calculates an amount (e.g., percentage) of available connectivity resources of the connections 118 that are utilized over T in both upstream and downstream directions.

The first traffic usage and the second traffic usage are compared to a threshold traffic pattern condition (block 410). For instance, the host controller 122 compares the first traffic usage and the second traffic usage to a threshold traffic pattern condition, e.g., a threshold amount of traffic in upstream and downstream directions across the connections 118. A determination is made whether to modify a direction of at least one connection based on the comparison of the first traffic usage and the second traffic usage to the threshold traffic pattern condition (block 412). The host controller 122, for example, determines whether to modify a traffic direction of a particular connection 118 and/or set of connections 118 based on whether the first traffic usage and/or the second traffic usage corresponds to the threshold traffic pattern condition. In at least one implementation the host controller 122 determines that data traffic usage in a particular direction meets or exceeds a threshold usage over T, and thus modifies a direction of a connection 118 to provide an additional connectivity resource in the particular direction.

Figure 5:
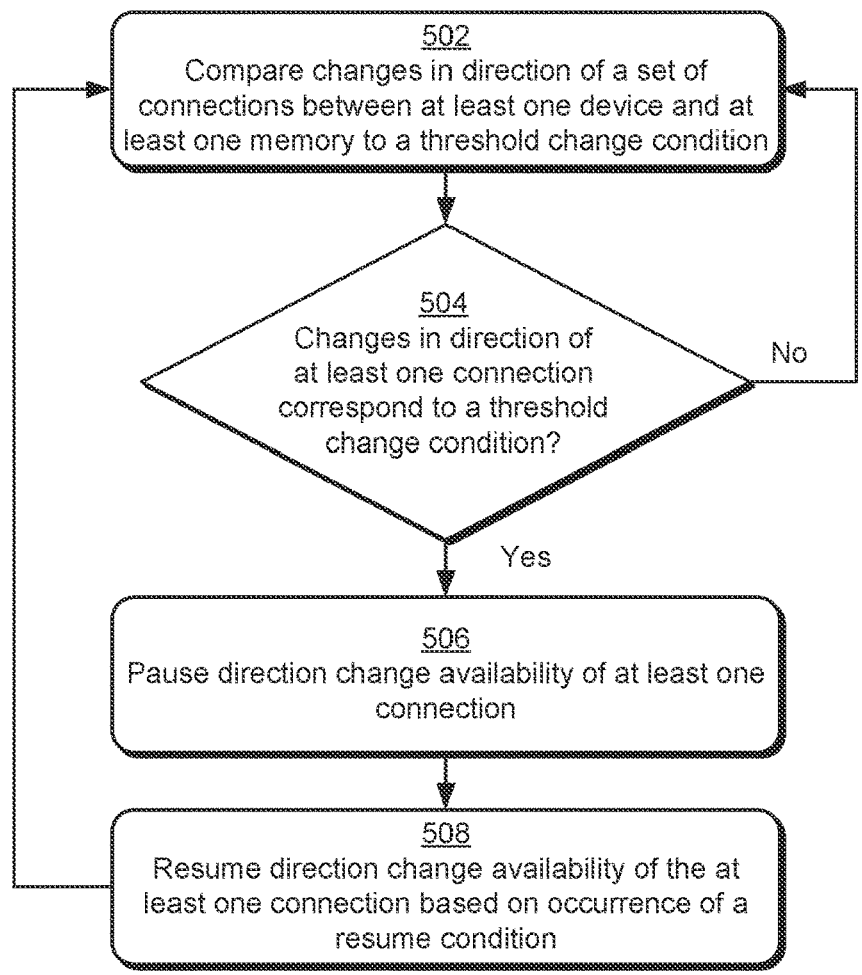
FIG. 5 illustrates a flow diagram depicting a procedure in an example implementation of connection modification based on traffic pattern in accordance with one or more implementations.

FIG. 5 illustrates a flow diagram depicting a procedure 500 in an example implementation of connection modification based on traffic pattern in accordance with one or more implementations. Aspects of the procedure 500, for example, are implemented in the context of the system 100. In at least one implementation the procedure 500 describes an example extension and/or variation of the procedures 300, 400.

Changes in direction of a set of connections between at least one device and at least one memory are compared to a threshold change condition (block 502). For instance, the host controller 122 tracks changes in direction of individual connections 118 and for each change in direction of a particular connection 118, increments a counter, e.g., a saturation counter as described above. A determination is made whether changes in direction of at least one connection correspond to a threshold change condition (block 504). The host controller 122, for example, compares counter values for individual connections 118 to a threshold change condition to determine whether at least one counter value meets or exceeds the threshold change condition. In at least one implementation the threshold change condition corresponds to a threshold number of direction changes over a time period.

If changes in direction of at least one connection do not correspond to the threshold change condition ("No"), the procedure returns to block 502. The host controller 122, for instance, continues to monitor changes in direction of individual connections 118 and to compare the changes in direction to the threshold change condition. If changes in direction of at least one connection correspond to the threshold change condition ("Yes"), direction change availability of the at least one connection is paused (block 506). The host controller 122, for example, determines that a direction change counter reaches a counter threshold. In at least one implementation, the host controller 122 temporarily flags the at least one connection as unavailable for a direction change. Thus, if the host controller 122 determines that a connection direction change is to occur (such as described above), the at least one connection is skipped as a candidate for a direction change.

Direction change availability of the at least one connection is resumed based on occurrence of a resume condition (block 508). The host controller 122, for example, detects occurrence of the resume condition and thus causes the at least one connection to be available for a direction change. The resume condition is definable in various ways, such as expiration of a timer, traffic load across the connections 118 exceeding a load threshold, etc. For instance, when direction change availability of the at least one connection is paused as described above, a timer is started. When the timer expires (e.g., the resume condition), direction change availability of the at least one connection is resumed. In at least some implementations, when the direction change availability of the at least one connection is resumed at block 508, the procedure returns to block 502.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, for example, the host 102, the memory 104, and/or the switch 106) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
    at least one processor; and
    computer-executable instructions that are executable by the at least one processor to:
        monitor a traffic pattern for memory operations across a set of connections between at least one device and at least one memory by monitoring a respective traffic size of the memory operations for a time period in each of two directions and calculating a respective traffic usage for the time period in each of the two directions based on the respective traffic size;
        compare the respective traffic usage in each of the two directions to a threshold traffic pattern condition that indicates a threshold amount of traffic for the time period in each of the two directions; and
        modify a traffic direction of at least one connection of the set of connections based on the respective traffic usage in the traffic direction corresponding to the threshold traffic pattern condition.

2. The system of claim 1, wherein the threshold traffic pattern condition comprises a first threshold amount of traffic in a first traffic direction across the set of connections, and wherein to modify the traffic direction of the at least one connection, the computer-executable instructions are executable by the at least one processor to modify the at least one connection from a second traffic direction to the first traffic direction when the respective traffic usage in the first traffic direction meets or exceeds the first threshold amount.

3. The system of claim 1, wherein:
the set of connections comprise a first subset of connections configured for a first traffic direction between the at least one device and the at least one memory, and a second subset of connections configured for a second traffic direction between the at least one memory and the at least one device, wherein the second subset of connections comprises the at least one connection configured for the second traffic direction;
to monitor the traffic pattern of memory operations comprises to monitor memory operations in the first traffic direction across the first subset of connections;
to compare the traffic pattern to the threshold traffic pattern condition comprises to compare the memory operations in the first traffic direction to a first threshold amount of the traffic in the first traffic direction; and
to modify the traffic direction of the at least one connection comprises to change the at least one connection to the first traffic direction based on the memory operations in the first traffic direction corresponding to the first threshold amount.

4. The system of claim 1, wherein to monitor the traffic pattern for memory operations comprises to:
calculate, over the time period, a first traffic size for memory operations in a first direction over the set of connections between the at least one device and the at least one memory;
calculate, over the time period, a second traffic size for memory operations in a second direction over the set of connections between the at least one memory and the at least one device;
calculate, based on the first traffic size, a first traffic usage for the set of connections utilized in the first direction over the time period; and
calculate, based on the second traffic size, a second traffic usage for the set of connections utilized in the second direction over the time period,
wherein the respective traffic usage in each of the two directions is based on at least one of the first traffic usage or the second traffic usage.

5. The system of claim 4, wherein the first traffic usage comprises a percentage of the set of connections utilized for traffic over the set of connections in the first direction over the time period, and the second traffic usage comprises a percentage of the set of connections utilized for traffic over the set of connections in the second direction over the time period.

6. The system of claim 1, wherein to modify the traffic direction of the at least one connection comprises to change the at least one connection from a first traffic direction across the set of connections to a second traffic direction across the set of connections, and wherein the computer-executable instructions are executable by the at least one processor to:
pause direction change availability of the at least one connection based on a change of the at least one connection from the first traffic direction to the second traffic direction corresponding to a threshold change condition.

7. The system of claim 1, wherein the computer-executable instructions are executable by the at least one processor to configure default traffic directions of a first subset of connections and a second subset of connections of the set of connections, wherein:
the first subset of connections is configured for a first traffic direction between the at least one device and the at least one memory; and
the second subset of connections is configured for a second traffic direction between the at least one device and the at least one memory,
wherein to configure the default traffic directions comprises to configure the first subset of connections with more connections of the set of connections than the second subset of connections.

8. A system comprising:
at least one processor; and
computer-executable instructions that are executable by the at least one processor to:
track changes in direction of a set of connections between at least one device and at least one memory over a time period;
compare the changes to a threshold change condition based on whether a counter threshold corresponding to a threshold number of direction changes over the time period is reached;
pause direction change availability of at least one connection of the set of connections based on the changes in direction of the at least one connection corresponding to the threshold change condition; and
resume direction change availability of the at least one connection based on occurrence of a resume condition.

9. The system of claim 8, wherein the computer-executable instructions are further executable by the at least one processor to increment a counter of the at least one connection in response to the changes in direction of the at least one connection, and wherein the threshold change condition comprises an indication that the counter reaches the counter threshold corresponding to the threshold number of direction changes over the time period.

10. A method comprising:
monitoring a traffic pattern of memory operations across a set of connections between at least one device and at least one memory by monitoring a respective traffic size of the memory operations for a time period in each of two directions and calculating a respective traffic usage for the time period in the each of the two directions based on the respective traffic size;
comparing the respective traffic usage in each of the two directions to a threshold traffic pattern condition that indicates a threshold amount of traffic for the time period in the each of the two directions; and
modifying a traffic direction of at least one connection of the set of connections based on the respective traffic usage in the traffic direction corresponding to the threshold traffic pattern condition.

11. The method of claim 10, wherein the threshold traffic pattern condition comprises a first threshold amount of traffic in a first traffic direction across the set of connections, and wherein modifying the traffic direction of the at least one connection comprises modifying the at least one connection from a second traffic direction to the first traffic direction when the respective traffic usage in the first traffic direction meets or exceeds the first threshold amount.

12. The method of claim 10, wherein:
the set of connections comprise a first subset of connections configured for a first traffic direction between the at least one device and the at least one memory, and a second subset of connections configured for a second traffic direction between the at least one memory and the at least one device, wherein the second subset of connections comprises the at least one connection configured for the second traffic direction;

monitoring the traffic pattern of memory operations comprises monitoring memory operations in the first traffic direction across the first subset of connections;

comparing the traffic pattern to the threshold traffic pattern condition comprises comparing the memory operations in the first traffic direction to a first threshold amount of the traffic in the first traffic direction; and modifying the traffic direction of the at least one connection comprises changing the at least one connection to the first traffic direction based on the memory operations in the first traffic direction corresponding to the first threshold amount.

13. The method of claim 12, wherein comparing the memory operations in the first traffic direction to the first threshold amount comprises:

calculating a traffic usage in the first traffic direction based on an amount of traffic in the first traffic direction and a number of connections in the first subset of connections; and comparing the respective traffic usage in the first traffic direction to the first threshold amount.

14. The method of claim 10, wherein monitoring the traffic pattern for memory operations comprises:

calculating, over the time period, a first traffic size for memory operations in a first direction over the set of connections between the at least one device and the at least one memory;

calculating, over the time period, a second traffic size for memory operations in a second direction over the set of connections between the at least one memory and the at least one device;

calculating, based on the first traffic size, a first traffic usage for the set of connections utilized in the first direction over the time period; and calculating, based on the second traffic size, a second traffic usage for the set of connections utilized in the second direction over the time period, wherein the respective traffic usage in each of the two directions is based on at least one of the first traffic usage or the second traffic usage.

15. The method of claim 14, wherein the first traffic usage comprises a percentage of the set of connections utilized for traffic over the set of connections in the first direction over the time period, and the second traffic usage comprises a percentage of the set of connections utilized for traffic over the set of connections in the second direction over the time period.

16. The method of claim 10, wherein modifying the traffic direction of the at least one connection comprises changing the at least one connection from a first traffic direction across the set of connections to a second traffic direction across the set of connections, and wherein the method further comprises:

pausing direction change availability of the at least one connection based on a change of the at least one connection from the first traffic direction to the second traffic direction corresponding to a threshold change condition.

17. The method of claim 10, wherein modifying the traffic direction of the at least one connection comprises changing the at least one connection from a first traffic direction across the set of connections to a second traffic direction across the set of connections, and wherein the method further comprises:

selecting the at least one connection for a direction change based on the at least one connection having a smallest pending queue of a subset of connections configured for the first traffic direction across the set of connections.

18. The method of claim 17, further comprising emptying the smallest pending queue before changing the at least one connection from the first traffic direction to the second traffic direction.

19. The method of claim 10, further comprising configuring default traffic directions of a first subset of connections and a second subset of connections of the set of connections, wherein:

the first subset of connections is configured for a first traffic direction between the at least one device and the at least one memory; and the second subset of connections is configured for a second traffic direction between the at least one device and the at least one memory, wherein configuring the default traffic directions comprises configuring the first subset of connections with more connections of the set of connections than the second subset of connections.

20. The method of claim 19, wherein the first traffic direction comprises upstream memory operations from the at least one memory to the at least one device, and the second traffic direction comprises downstream memory operations from the at least one device to the at least one memory.

* * * * *